(12) United States Patent
Dillon et al.

(10) Patent No.: US 7,500,321 B1
(45) Date of Patent: Mar. 10, 2009

(54) THREADING TOOL AND METHOD OF THREADING

(75) Inventors: Reily M. Dillon, Chanhassen, MN (US); Kurt Thomas Rolling, Shoreview, MN (US)

(73) Assignee: OakRiver Technology, Inc., Oakdale, MN (US)

( * ) Notice: Subject to any disclaimer, the term of this patent is extended or adjusted under 35 U.S.C. 154(b) by 790 days.

(21) Appl. No.: 11/055,913

(22) Filed: Feb. 11, 2005

Related U.S. Application Data

(60) Provisional application No. 60/544,444, filed on Feb. 13, 2004.

(51) Int. Cl.
*G01D 21/00* (2006.01)
(52) U.S. Cl. .............................. 33/645; 33/613; 33/626
(58) Field of Classification Search .................. 33/645, 33/644, 613, 626, 629
See application file for complete search history.

(56) References Cited

U.S. PATENT DOCUMENTS

| | | | |
|---|---|---|---|
| 4,467,687 A * | 8/1984 | Fokos et al. .................... | 33/633 |
| 6,199,290 B1 * | 3/2001 | Nguyen ....................... | 33/613 |
| 6,598,309 B1 * | 7/2003 | Coombs ....................... | 33/644 |
| 2002/0092193 A1 * | 7/2002 | DeCecca et al. .............. | 33/613 |

* cited by examiner

*Primary Examiner*—Yaritza Guadalupe-McCall
(74) *Attorney, Agent, or Firm*—Sherrill Law Offices, PLLC

(57) ABSTRACT

A tool for facilitating threading of a flexible filament or sheet into a hole or opening. The tool includes (i) a filament or sheet guide having a longitudinally extending trough, and (2) an alignment system with (A) a first registration surface configured and arranged to transversely align a hole in a target-piece with the trough when the target-piece abuts the first registration surface, and (B) a second registration surface configured and arranged to laterally align a hole in a target-piece with the trough when the target-piece abuts the second registration surface. Threading of the filament or sheet into the hole or opening can then be achieved by simply causing an upward deflection of a distal portion of the flexible filament or sheet within the trough and moving the deflected distal portion of the filament or sheet along the length of the trough towards the aligned hole or opening in the target-piece until the distal end portion enters the hole or opening.

22 Claims, 7 Drawing Sheets

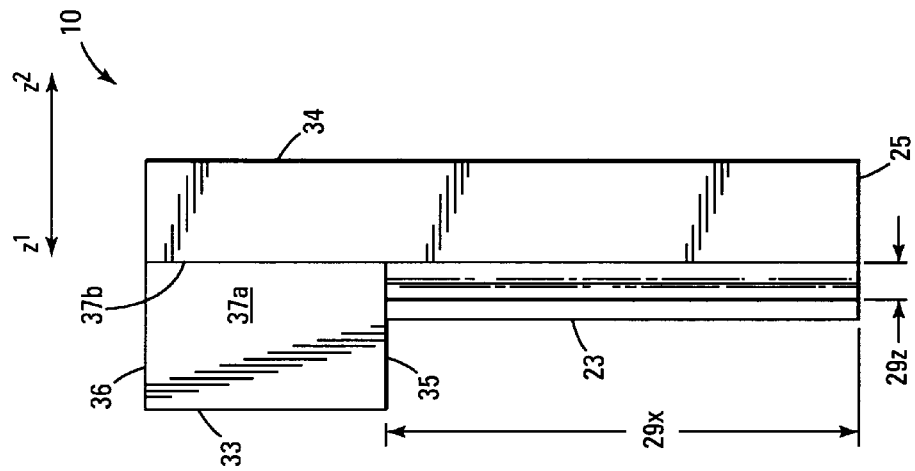
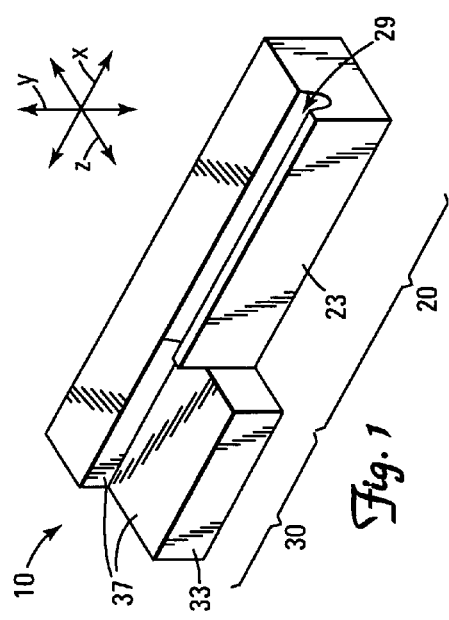
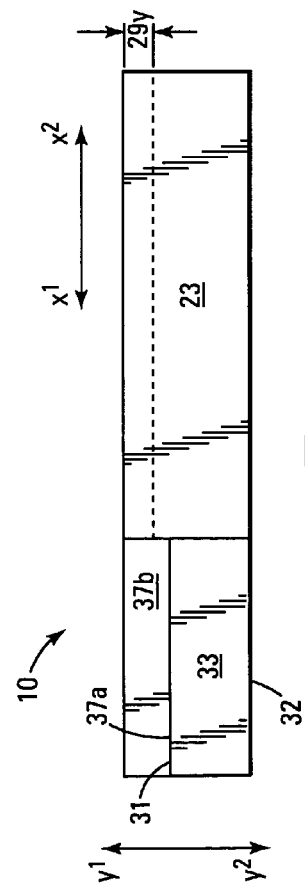

THREADING TOOL AND METHOD OF THREADING

This application claims the benefit of U.S. provisional patent application Ser. No. 60/544,444, filed Feb. 13, 2004.

FIELD OF THE INVENTION

The invention relates to tools for facilitating threading of a flexible filament into a hole or inserting a flexible sheet into a hole.

BACKGROUND

Construction, assembly and testing of devices ranging from microelectronic components to highway bridges often require threading of a flexible filament into a hole and/or insertion of a flexible sheet into a hole, often under conditions of tight tolerances.

One technique commonly employed to thread a flexible filament into a hole and/or insert a flexible sheet into a hole is the classic hit-and-miss technique using eye-hand coordination, dexterity and repeated attempts to thread the filament into the hole or insert the sheet into the hole. While generally effective, this technique is slow and tedious.

Another technique employs position sensors and robotics to align a filament with a hole and/or align a sheet with a hole and then thread the filament into the hole and/or insert the sheet into the hole. While much more efficient than the hit-and-miss technique, this technique requires the use of equipment which is expensive to obtain and maintain.

Accordingly, a substantial need exists for an inexpensive tool capable of facilitating the quick and easy threading of a filament into a hole or insertion of a sheet into a hole, even under conditions of tight tolerances.

SUMMARY OF THE INVENTION

A first embodiment of a first aspect of the invention is a tool effective for facilitating threading of a flexible filament into a hole. The tool includes (1) a filament guide having a longitudinally extending trough, and (2) an alignment system. The alignment system includes (A) a first registration surface configured and arranged to transversely align a hole in a target-piece with the trough when the target-piece abuts the first registration surface, and (B) a second registration surface configured and arranged to laterally align a hole in a target-piece with the trough when the target-piece abuts the second registration surface. The tool facilitates threading of a flexible filament into a hole in a target-piece by (i) longitudinally aligning the hole with the trough when the target-piece abuts the first and second registration surfaces, and (ii) laterally and transversely constraining a distal portion of the flexible filament within the trough when the distal portion of the flexible filament is forced against the trough wall so as to generate a transverse deflection of the distal portion of the flexible filament. Threading of the filament into the hole can then be achieved by simply moving the constrained distal portion of the flexible filament along the length of the trough towards the aligned hole in the target-piece.

A second embodiment of a first aspect of the invention is a tool effective for facilitating insertion of a flexible sheet into a hole. The tool includes (1) a sheet guide having a longitudinally extending trough, and (2) an alignment system. The alignment system includes (A) a first registration surface configured and arranged to transversely align a hole in a target-piece with the trough when the target-piece abuts the first registration surface, and (B) a second registration surface configured and arranged to laterally align a hole in a target-piece with the trough when the target-piece abuts the second registration surface. The tool facilitates insertion of a flexible sheet into a hole in a target-piece by (i) longitudinally aligning the hole with the trough when the target-piece abuts the first and second registration surfaces, and (ii) laterally and transversely constraining a distal portion of the flexible sheet within the trough when the distal portion of the flexible sheet is forced against the trough wall so as to generate a transverse deflection of the distal portion of the flexible sheet. Insertion of the sheet into the hole can then be achieved by simply moving the constrained distal portion of the flexible sheet along the length of the trough towards the aligned hole in the target-piece.

A first embodiment of a second aspect of the invention is a method of threading a flexible filament into a hole in a target-piece. The method involves the steps of (1) obtaining a tool comprising, (A) a filament guide having a longitudinally extending trough, and (B) an alignment system having, (i) a first registration surface configured and arranged to transversely align the hole in the target-piece with the trough when the target-piece abuts the first registration surface, and (ii) a second registration surface configured and arranged to laterally align the hole in the target-piece with the trough when the target-piece abuts the second registration surface, (2) abutting the target-piece against the first and second registration surfaces so as to longitudinally align the hole with the trough, (3) laterally and transversely constraining a distal portion of the flexible filament within the trough by forcing the distal portion of the flexible filament against the trough wall and generating a transverse deflection of the distal portion of the flexible filament, and (4) moving the constrained distal portion of the flexible filament along the length of the trough and into the aligned hole in the target-piece.

A second embodiment of the second aspect of the invention is a method of threading a flexible sheet into a hole in a target-piece. The method involves the steps of (1) obtaining a tool comprising, (A) a sheet guide having a longitudinally extending trough, and (B) an alignment system having, (i) a first registration surface configured and arranged to transversely align the hole in the target-piece with the trough when the target-piece abuts the first registration surface, and (ii) a second registration surface configured and arranged to laterally align the hole in the target-piece with the trough when the target-piece abuts the second registration surface, (2) abutting the target-piece against the first and second registration surfaces so as to longitudinally align the hole with the trough, (3) laterally and transversely constraining a distal portion of the flexible sheet within the trough by forcing the distal portion of the flexible sheet against the trough wall and generating a transverse deflection of the distal portion of the flexible sheet, and (4) moving the constrained distal portion of the flexible sheet along the length of the trough and into the aligned hole in the target-piece.

BRIEF DESCRIPTION OF THE DRAWINGS

FIG. 1 is a perspective view of one embodiment of the invention with a straight trough.

FIG. 2 is a front plan view of the invention shown in FIG. 1.

FIG. 3 is a top plan view of the invention shown in FIG. 1.

DETAILED DESCRIPTION OF THE INVENTION INCLUDING A BEST MODE

Nomenclature

Figure 4:
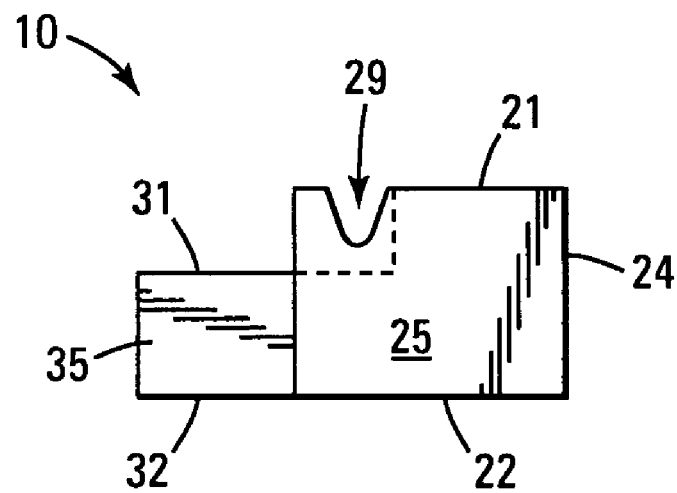
FIG. 4 is a right side plan view of the invention shown in FIG. 1.
Figure 5:
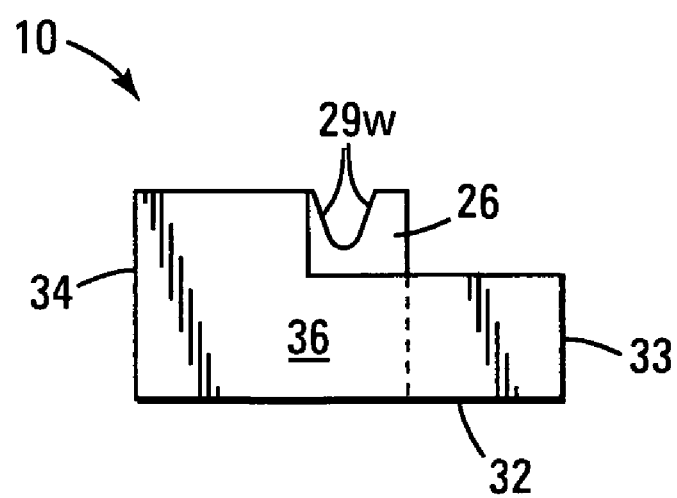
FIG. 5 is a left side plan view of the invention shown in FIG. 1.
Figure 6:
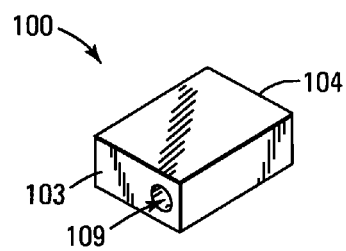
FIG. 6 is a perspective view of one embodiment of a target-piece having a hole.
Figure 7:
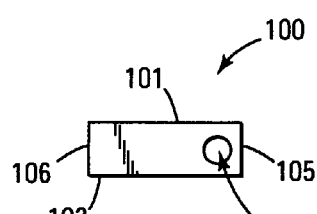
FIG. 7 is a front plan view of the target-piece shown in FIG. 6.
Figure 8:
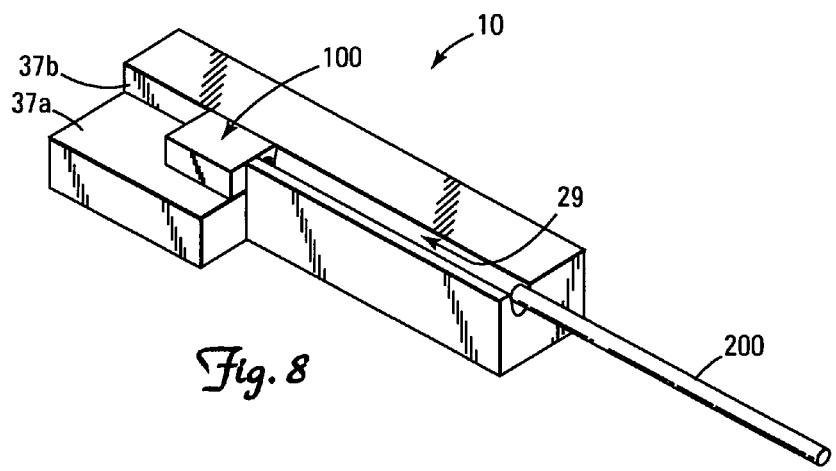
FIG. 8 is a perspective view of a combination of the tool shown in FIG. 1 with the target-piece shown in FIG. 6 registered on the tool and a filament positioned above the trough.

| | |
|---|---|
| 10 | Tool |
| 20 | Guide System |
| 21 | Top of Guide System |
| 22 | Bottom of Guide System |
| 23 | Front of Guide System |
| 24 | Back of Guide System |
| 25 | Right Side of Guide System |
| 26 | Left Side of Guide System |
| 29 | Trough in Top of Guide System |
| 29w | Wall(s) Defining Trough in Top of Guide System |
| 29x | Length of Trough |
| 29y | Depth of Trough |
| 29z | Width of Trough |
| 30 | Alignment System |
| 31 | Top of Alignment System |
| 32 | Bottom of Alignment System |
| 33 | Front of Alignment System |
| 34 | Back of Alignment System |
| 35 | Right Side of Alignment System |
| 36 | Left Side of Alignment System |
| 37 | Registration Surfaces |
| 37a | First Registration Surface |
| 37b | Second Registration Surface |
| 100 | Target-Piece |
| 101 | Top of Target-Piece |
| 102 | Bottom or Underside of Target-Piece |

-continued

| | |
|---|---|
| 103 | Front of Target-Piece |
| 104 | Back of Target-Piece |
| 105 | Right Side of Target-Piece |
| 106 | Left Side of Target-Piece |
| 109 | Opening, Bore or Slot In Target-Piece |
| 200 | Filament |
| 201 | Distal End of Filament |
| 201p | Distal Portion of Filament |
| 209 | Deflection Point |
| 300 | Sheet |
| 301 | Distal End of Sheet |
| 301p | Distal Portion of Sheet |
| 309 | Deflection Point |
| x | Longitudinal Axis |
| $x^1$ | Left Direction |
| $x^2$ | Right Direction |
| y | Transverse Axis |
| $y^1$ | Upward Direction |
| $y^2$ | Downward Direction |
| z | Latitudinal Axis |
| $z^1$ | Forward Direction |
| $z^2$ | Backward Direction |

Construction

A first aspect of the invention is a tool 10 having a guide system 20 and an alignment system 30 which facilitates threading of a flexible filament 200 or a flexible sheet 300 into an opening 109 in a target-piece 100. The tool 10 is simple, easy and inexpensive to manufacture and use and does not required any moving parts.

The tool 10 can be manufactured from a wide variety of materials capable of being formed or machined with precision and having superior dimensional stability over the temperature and humidity changes typically encountered in commercial and industrial settings. Suitable materials include specifically but not exclusively, glass, metals such as aluminum and steel, plastics such as polyethylene and polyurethane, and high durometer rubbers.

A first embodiment of the tool 10, shown in FIGS. 1-5, is configured and arranged to guide the distal end 201 of a filament 200 into a bore 109 in a target-piece 100.

Referring to FIGS. 1-5, the guide system 20 has a top 21, bottom 22, front 23, back 24, right side 25 and left side 26. A longitudinally x extending upwardly $y^1$ open trough 29 is formed in the top 21 of the guide system 20. The trough 29 is configured and arranged to accommodate and precisely constrain the distal portion 201$p$ of an upwardly $y^1$ deflected filament 200 in the transverse y and lateral z directions. When the filament 200 has a circular cross-section, the trough 29 preferably has a V, U or circular segment cross-sectional shape. When the filament 200 has a cross-sectional shape which is something other than circular, a trough 29 with a V, U or circular segment cross-section shape will often be sufficient, but in certain circumstances may need to be provided with a customized cross-sectional shape to properly accommodate and constrain the filament 200.

The trough 29 does not constrain a filament 200 in the upward $y^1$, left $x^1$ or right $x^2$ directions. The trough 29 is upwardly $y^1$ open and relies upon a downward $y^2$ force created by upward $y^1$ deflection of the distal portion 201$p$ of the filament 200 to keep the distal portion 201$p$ of the filament 200 in constant contact with the wall(s) 29$w$ of the trough 29 and prevent an upward $y^1$ movement of the distal portion 201$p$ of the filament 200 within the trough 29. The trough 29 permits substantially unimpeded sliding of the distal portion 201$p$ of a filament 200 along the length 29$x$ of the trough 29 in both the left $x^1$ and right $x^2$ directions.

Figure 10:
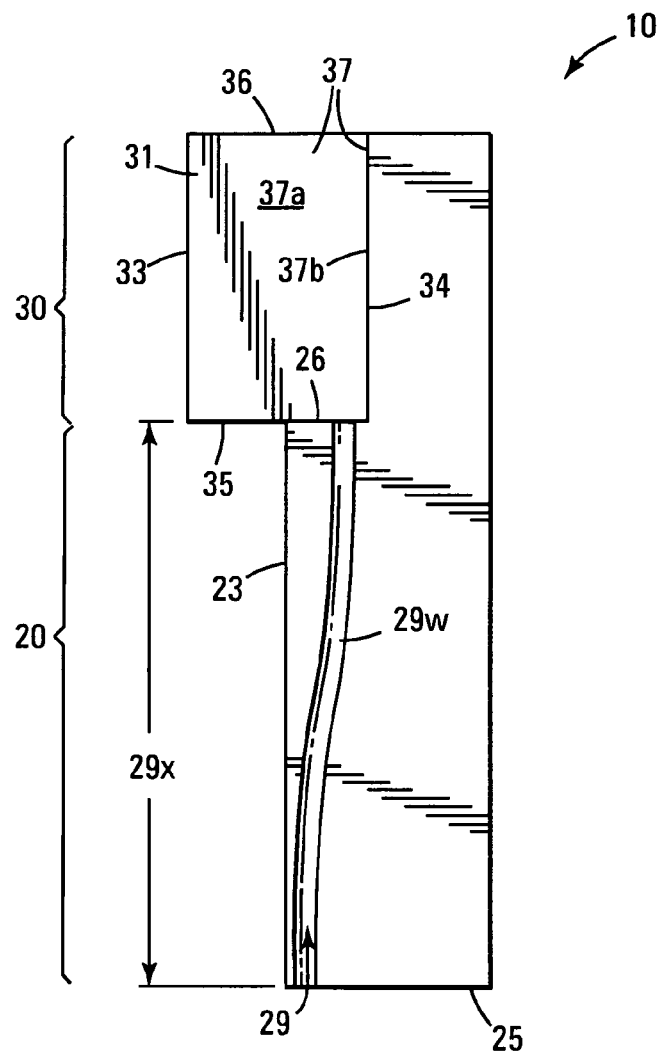
FIG. 10 is a top plan view of a second embodiment of the invention with a curved, circular section-shaped trough.
Figure 11:
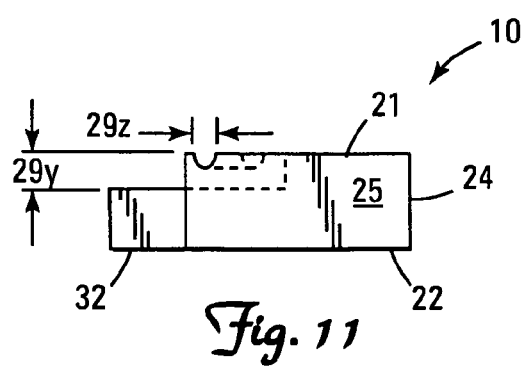
FIG. 11 is a right side plan view of the invention shown in FIG. 9.

The trough 29 may be entirely straight, such as shown in the embodiment depicted in FIGS. 1-5, or may be curved in the transverse y and/or lateral z directions, such as shown in the embodiment depicted in FIGS. 10 and 11.

Referring again to FIGS. 1-5, the alignment system 30 has a top 31, bottom 32, front 33, back 34, right side 35 and left side 36. The alignment system 30 has a first registration surface 37a configured and arranged to contact and stably support the underside 102 of a target-piece 100, and a second registration surface 37b configured and arranged to contact and stably support one of the sides 105 or 106 of a target-piece 100. Abutting a target-piece 100 against the registration surfaces 37 stably and precisely positions the target-piece 100 in both the transverse y and lateral z directions.

The registration surfaces 37 are preferably sized and shaped to stably contact the intended target-piece 100. The registration surface 37 may be sized, shaped and configured to conform precisely with the profile of the target-piece 100, or may be sized, shaped and configured to provide only lines of contact (e.g., parallel projecting ribs or an oversized V-shaped channel) or individual points of contact (e.g., a plurality of spaced bumps). The size, shape, configuration, arrangement, surface texture, etc. may be selected as desired so long as the registration surface 37 are effective for stably supporting a target-piece 100 in the transverse y and lateral z directions.

The alignment system 30 is positioned at the left side 26 of the guide system 20 so that a target-piece 100 may be positioned immediately adjacent the left end (unnumbered) of the trough 29.

The left side 26 of the guide system 20 is preferably configured and arranged to function as a third registration surface for contacting and stably supporting the front 103 of a target-piece 100.

The target-piece 100 need only abut the first 37a and second 37b registration surfaces 37 to achieve the longitudinal alignment necessary for operation of the tool 10. If desired, additional registration surfaces may be provided for contacting the top 101 and/or back 104 of the target-piece 100 but are not required and can often interfere with both loading of a target-piece 100 into the alignment system 30 and visual inspection of the threading process.

The size, shape and relative positioning of the trough 29 and registration surfaces 37 are determined based upon the size and shape of the target-piece 100, the size and cross-sectional shape of the filament 200, and the position of the bore 109 on the target-piece 100 into which the filament 200 is to be threaded. The trough 29 and registration surfaces 37 must precisely longitudinally x align the bore 109 in the target-piece 100 with the distal end 201 of the filament 200 when the target-piece 100 is registered against the registration surfaces 37 and the distal portion 201p of the filament 200 is constrained against the walls 29w of the trough 29 by upward $y^1$ deflection of the distal portion 201p of the filament 200.

The guide system 20 and alignment system 30 may be separate pieces which are then mechanically or chemically attached to create the tool 10, but are preferably constructed from a single mass of material to ensure a proper and continuous positioning of the two systems relative to one another.

Figure 12:
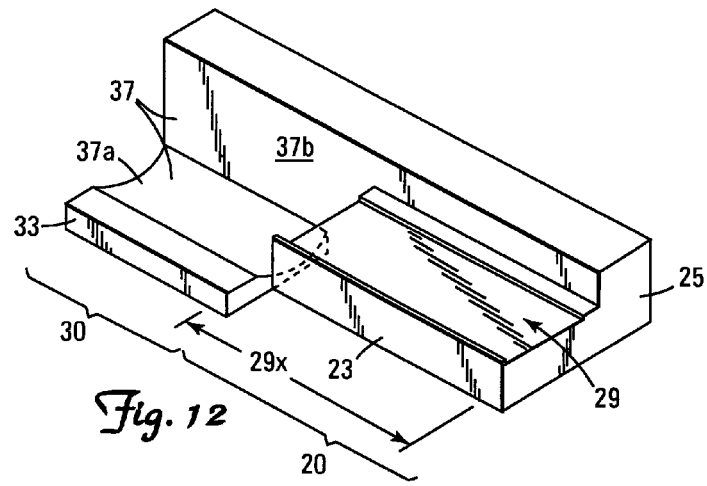
FIG. 12 is a perspective view of a third embodiment of the invention.
Figure 13:
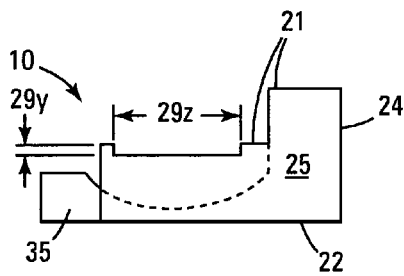
FIG. 13 is a right side plan view of the invention shown in FIG. 11.
Figure 14:
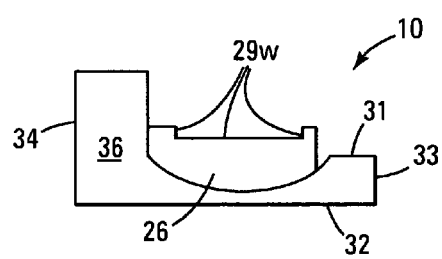
FIG. 14 is a left side plan view of the invention shown in FIG. 11.
Figure 15:
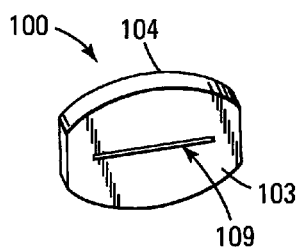
FIG. 15 is a perspective view of one embodiment of a target-piece having a hole.
Figure 16:
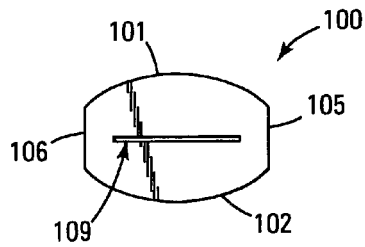
FIG. 16 is a front plan view of the target-piece shown in FIG. 14.
Figure 17:
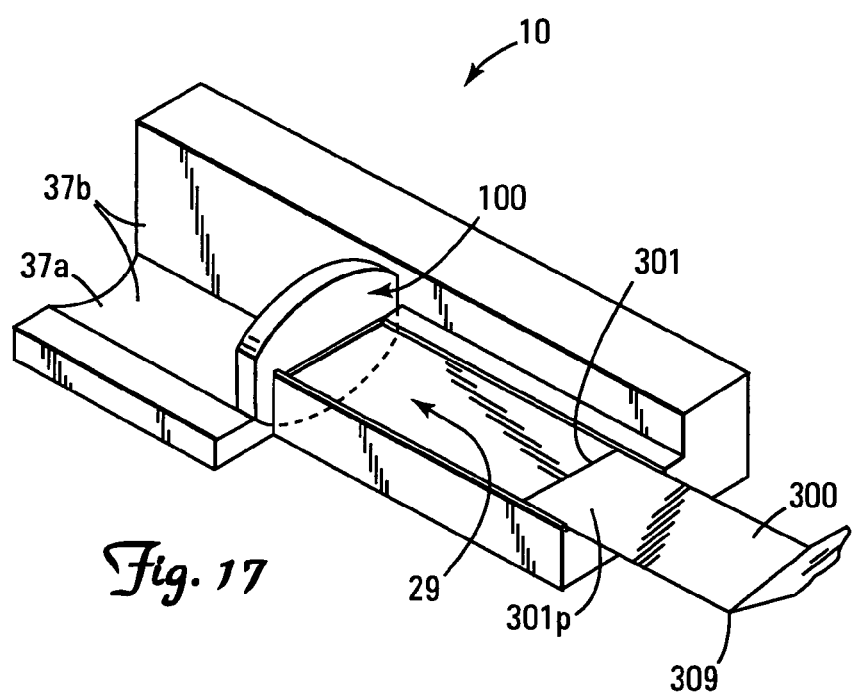
FIG. 17 is a perspective view of a combination of the tool shown in FIG. 11 with the target-piece shown in FIG. 14 registered on the tool and a sheet positioned above the trough.

A second embodiment of the tool 10, shown in FIGS. 12-14, is configured and arranged to guide the distal end 301 of a sheet 300 into a slot 109 in a target-piece 100. The basic design and operation of the second embodiment of the tool 10 is essentially the same as the first embodiment of the tool 10 except that the ratio of the width 29z of the trough 29 to the depth 29y of the trough 29 will likely be significantly larger in the second embodiment for purposes of accommodating a sheet 300 rather than a filament 200.

Use

Use of the tool 10 to thread the distal portion 201p of a filament 200 through a bore 109 in a target-piece 100 is generally depicted in FIGS. 9A-9D. The procedure is essentially the same when threading the distal portion 301p of a sheet 300 through a slot 109 in a target-piece 100.

Figure 9A:
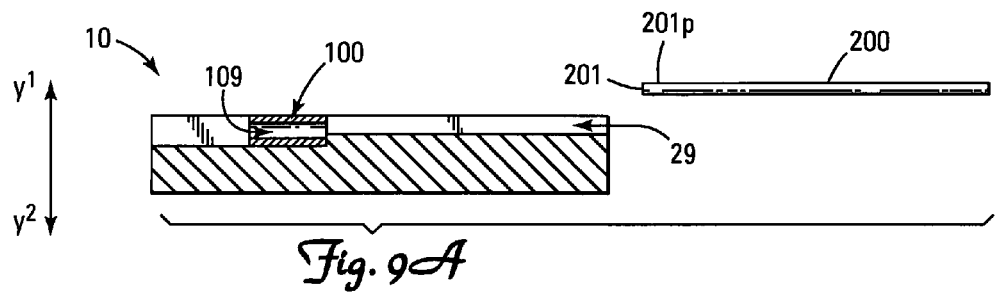
FIG. 9A is a cross-section front plan view of the combination shown in FIG. 6.

Referring to FIG. 9A, the target-piece 100 is positioned into the alignment system 30 and properly registered against the first and second registration surfaces 37a and 37b so as to longitudinally x align the bore 109 in the target-piece 100 with the trough 29. The target-piece 100 is also preferably positioned to abut the left side 26 of the guide system 20.

Figure 9B:
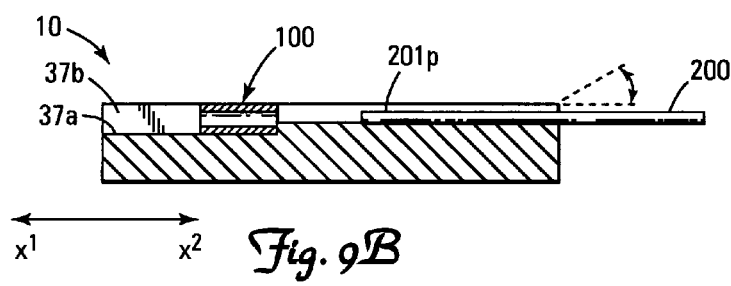
FIG. 9B is a cross-section front plan view of the combination shown in FIG. 9A with a distal portion of the filament position within the trough.
Figure 9C:
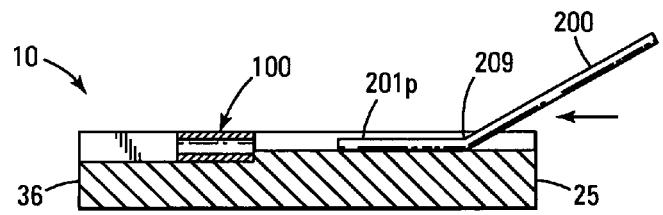
FIG. 9C is a cross-section front plan view of the combination shown in FIG. 9B with the distal portion of the filament deflected within the trough.

Referring to FIGS. 9B and 9C, the distal portion 201p of the filament 200 is positioned within the trough 29 and the filament 200 angled upward $y^1$ relative to the trough 29 so as to cause the distal portion 201p of the filament 200 to be deflected upward $y^1$ by the wall(s) 29w of the trough 29 and thereby constrain the distal portion 201p of the filament 200 within the trough 29.

The point of deflection 209 on the filament 200 needs be positioned close enough to the distal end 201 of the filament to ensure that the downward $y^2$ force created by deflection of the filament 200 is sufficient to maintain the distal end 201 of the filament fully constrained against the walls 29w of the trough 29. An increase in the distance between the distal end 201 of the filament 200 and the deflection point 209 on the filament 200 causes a decrease in the downward $y^2$ force acting upon the distal end 201 of the filament 200.

The preferred angle of deflection (unnumbered) depends upon a number of factors, including specifically but not exclusively the flexibility of the filament 200, the elasticity of the filament 200, and the distance between the distal end 201 of the filament 200 and the deflection point 209 on the filament 200. Generally an angle of deflection of between about 1° to 160° will provide the necessary and desired functionality, with an angle of between about 20° to 60° generally preferred. An angle of less than about 1° may not provide sufficient downward $y^2$ force along the length of the filament to properly constrain the distal portion 201p of the filament 200 within the trough 29 while an angle of greater than about 160° creates an unnecessarily severe bend angle on the filament 200 which may damage the filament 200.

Figure 9D:
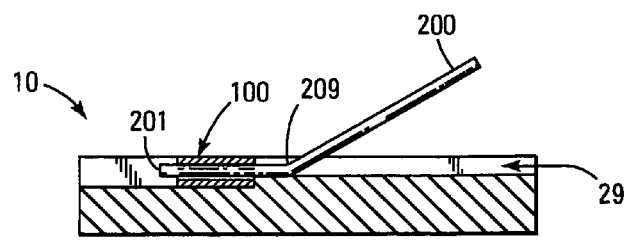
FIG. 9D is a cross-section front plan view of the combination shown in FIG. 9C with the deflected distal portion of the filament moved left along the length of the trough and through the hole in the target-piece.

Referring to FIG. 9D, the deflected filament 200 is then pushed in the longitudinal x direction towards the target-piece 100 until the distal portion 201p of the filament 200 is threaded the desired distance into or through the bore 109 in the target-piece 100.

The threaded target-piece 100 and filament 200 may then be retained in place on the tool 10 or removed as a unit for further treatment, such as testing the electrical properties of the target-piece 100 by passing an electrical current along the filament 100 and into the target-piece 100, filling a chamber (not shown) in the target-piece 100 with a liquid (not shown) by pumping the liquid through a lumen (not shown) in the filament 200, crimping the target-piece 100 onto the filament 200, coating the target-piece 100 and distal portion 201p of the filament 200 with a resin or thin layer of vapor deposited metal, etc.

We claim:

1. A tool, comprising:
   (a) a filament guide having a longitudinally extending trough defined by a trough wall and having a length, and
   (b) an alignment system having,
      (i) a first registration surface configured and arranged to transversely align a hole in a target-piece with the trough when the target-piece abuts the first registration surface, and
      (ii) a second registration surface configured and arranged to laterally align a hole in a target-piece with the trough when the target-piece abuts the second registration surface, (c) whereby a flexible filament may be threaded into a hole in a target-piece by (i) abutting the target-piece against the first and second registration surfaces so as to longitudinally align the hole with the trough, (ii) laterally and transversely constraining a distal portion of the flexible filament within the trough by forcing the distal portion of the flexible filament against the trough wall and generating a transverse deflection of the distal portion of the flexible filament, and (iii) moving the constrained distal portion of the flexible filament along the length of the trough and into the aligned hole in the target-piece.

2. The tool of claim 1 further comprising a third registration surface configured and arranged to longitudinally position a hole in a target-piece immediately adjacent a longitudinal end of the trough.

3. The tool of claim 1 constructed from a single unitary mass.

4. The tool of claim 1 wherein the tool has no moving parts.

5. The tool of claim 1 wherein the trough is a V-shaped, U-shaped or circular segment shaped trough.

6. The tool of claim 1 wherein the entire length of the trough is linear.

7. The tool of claim 1 wherein the trough is curved.

8. A tool, comprising:
   (a) a sheet guide having a longitudinally extending trough defined by a trough wall and having a length, and
   (b) an alignment system having,
      (i) a first registration surface configured and arranged to transversely align a hole in a target-piece with the trough when the target piece abuts the first registration surface, and
      (ii) a second registration surface configured and arranged to laterally aligning a hole in a target-piece with the trough when the target piece abuts the second registration surface,
   (c) whereby a flexible sheet may be inserted into a hole in a target-piece by (i) abutting the target-piece against the first and second registration surfaces so as to longitudinally align the hole with the trough, (ii) laterally and transversely constraining a distal portion of the flexible sheet within the trough by forcing the distal portion of the flexible sheet against the trough wall and generating a transverse deflection of the distal portion of the flexible sheet, and (iii) moving the constrained distal portion of the flexible sheet along the length of the trough and into the aligned hole in the target-piece.

9. The tool of claim 8 further comprising a third registration surface configured and arranged to longitudinally position a hole in a target-piece immediately adjacent a longitudinal end of the trough.

10. The tool of claim 8 constructed from a single unitary mass.

11. The tool of claim 8 wherein the tool has no moving parts.

12. The tool of claim 8 wherein the trough is a U-shaped trough with a curved or planar base, or a circular segment shaped trough.

13. A method of threading a flexible filament into a hole in a target-piece, comprising:
   (a) obtaining a tool, comprising:
      (i) a filament guide having a longitudinally extending trough defined by a trough wall and having a length, and
      (ii) an alignment system having,
         (A) a first registration surface configured and arranged to transversely align the hole in the target-piece with the trough when the target-piece abuts the first registration surface, and
         (B) a second registration surface configured and arranged to laterally align the hole in the target-piece with the trough when the target-piece abuts the second registration surface,
   (b) abutting the target-piece against the first and second registration surfaces so as to longitudinally align the hole with the trough,
   (c) laterally and transversely constraining a distal portion of the flexible filament within the trough by forcing the distal portion of the flexible filament against the trough wall and generating a transverse deflection of the distal portion of the flexible filament, and
   (d) moving the constrained distal portion of the flexible filament along the length of the trough and into the aligned hole in the target-piece.

14. The method of claim 13 wherein step (b) is performed by hand.

15. The method of claim 13 wherein step (b) is automated.

16. The method of claim 13 wherein steps (c) and (d) are performed by hand.

17. The method of claim 13 wherein steps (c) and (d) are automated.

18. A method of inserting a flexible sheet into a hole in a target-piece, comprising:
   (a) obtaining a tool, comprising:
      (i) a sheet guide having a longitudinally extending trough defined by a trough wall and having a length, and
      (ii) an alignment system having,
         (A) a first registration surface configured and arranged to transversely align the hole in the target-piece with the trough when the target-piece abuts the first registration surface, and
         (B) a second registration surface configured and arranged to laterally align the hole in the target-piece with the trough when the target-piece abuts the second registration surface,
   (b) abutting the target-piece against the first and second registration surfaces so as to longitudinally align the hole with the trough,
   (c) laterally and transversely constraining a distal portion of the flexible sheet within the trough by forcing the distal portion of the flexible sheet against the trough wall and generating a transverse deflection of the distal portion of the flexible sheet, and
   (d) moving the constrained distal portion of the flexible sheet along the length of the trough and into the aligned hole in the target-piece.

19. The method of claim 18 wherein step (b) is performed by hand.

20. The method of claim 18 wherein step (b) is automated.

21. The method of claim 18 wherein steps (c) and (d) are performed by hand.

22. The method of claim 18 wherein steps (c) and (d) are automated.

* * * * *